United States Patent
Karunaratne et al.

(10) Patent No.: US 12,243,220 B2
(45) Date of Patent: Mar. 4, 2025

(54) SYSTEMS AND METHODS FOR EQUIPMENT INSPECTION

(71) Applicant: Transportation IP Holdings, LLC, Norwalk, CT (US)

(72) Inventors: Milan Karunaratne, Orange, CA (US); Nathan Thomas North, Seattle, WA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 554 days.

(21) Appl. No.: 17/523,343

(22) Filed: Nov. 10, 2021

(65) Prior Publication Data

US 2022/0198632 A1 Jun. 23, 2022

Related U.S. Application Data

(60) Provisional application No. 63/130,085, filed on Dec. 23, 2020.

(51) Int. Cl.
G06T 7/00 (2017.01)

(52) U.S. Cl.
CPC .... *G06T 7/001* (2013.01); *G06T 2207/10016* (2013.01); *G06T 2207/20081* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 2018/0330287 A1 | 11/2018 | Tripathi | |
| 2019/0258225 A1 | 8/2019 | Link et al. | |
| 2019/0325606 A1* | 10/2019 | Oota | G06T 7/001 |

(Continued)

FOREIGN PATENT DOCUMENTS

| | | |
|---|---|---|
| JP | 201915654 A | 1/2019 |
| WO | 2019131742 A1 | 12/2020 |

OTHER PUBLICATIONS

European Search Report received for related European Patent Application No. 21 21 7172 dated May 6, 2022 (8 pages).

(Continued)

*Primary Examiner* — Gabriel I Garcia
(74) *Attorney, Agent, or Firm* — K&L Gates LLP

(57) ABSTRACT

A method includes receiving image data representative of an appearance of an equipment part prior to an inspection process and evaluating the image data with a machine learning model that defines baseline image data to determine whether the image data indicates the equipment part has been prepared for the inspection. The inspection process may be prevented when the evaluation indicates that the equipment part has not been prepared. A system includes a controller that receives image data representative of an appearance of an equipment part obtained prior to an inspection process. The controller uses a machine learning model to evaluate the image data with respect to baseline image data to determine whether the equipment part has been prepared for the inspection process. The controller prevents the performance of the inspection process based on the evaluation indicating that the equipment part has not been prepared for the inspection process.

17 Claims, 10 Drawing Sheets

(56) References Cited

U.S. PATENT DOCUMENTS

2019/0362480 A1    11/2019  Diao et al.
2020/0005422 A1     1/2020  Subramanian et al.
2020/0160498 A1*    5/2020  Coker .................... H04N 23/73

OTHER PUBLICATIONS

Office Action received for related JP Patent Application No. 2021-186496 dated Mar. 24, 2023 (7 pages).
First Examination Report mailed Oct. 21, 2022 for corresponding Australian Patent Application No. 2021273611 (4 pages).
Second Examination Report mailed Jan. 25, 2023 for corresponding Australian Patent Application No. 2021273611 (7 pages).

* cited by examiner

SYSTEMS AND METHODS FOR EQUIPMENT INSPECTION

CROSS REFERENCE TO RELATED APPLICATION

This application claims priority to U.S. Provisional Application 63/130,085, filed 23 Dec. 2020, the entire disclosure of which is incorporated herein by reference.

BACKGROUND

Technical Field

The disclosed subject matter described herein relates to systems and methods for inspecting equipment. More specifically, the disclosed subject matter described herein relates to systems and methods to evaluate visual inspection criteria, provide feedback and/or assessments of the visual inspection criteria, and provide tracking and notifications of the visual inspection criteria.

Discussion of Art

Inspection of equipment such as parts of vehicles is done to detect parts that may be damaged or defective, or close to being damaged or defective. The inspection may be performed according to a process that is established for each part. However, compliance with the process may vary depending on the inspector, which may lead to inaccurate results. Inspectors may not have access to previous inspection results which makes it difficult to determine whether previous inspections were performed according to the established process. If a part is inspected and incorrectly identified as not being damaged or defective, a failure of the part may result in the equipment (e.g., a locomotive) breaking down. Conversely, if a part is inspected and incorrectly identified as being damaged or defective, unnecessary replacement of the part results in removal of the equipment from service and additional repair costs.

BRIEF DESCRIPTION

In accordance with one embodiment, a method may include receiving image data representative of an appearance of an equipment part. The image data may be obtained prior to performance of an inspection process on the equipment part. The method may also include evaluating the image data with a machine learning model that defines baseline image data to determine whether the image data indicates that the equipment part has been prepared for the inspection process. The method may further include preventing the performance of the inspection process on the equipment part when the evaluation of the image data with respect to the baseline image data indicates that the equipment part has not been prepared for the inspection process In accordance with one embodiment, a system may include a controller that receives image data representative of an appearance of an equipment part. The image data may be obtained prior to performance of an inspection process on the equipment part. The controller may use a machine learning model to evaluate the image data with respect to baseline image data to determine whether the equipment part has been prepared for the inspection process. The controller may prevent the performance of the inspection process on the equipment part based on the evaluation of the image data with respect to the baseline image data indicating that the equipment part has not been prepared for the inspection process In accordance with one embodiment, a method may include receiving a first image of an equipment part prior to inspection of the equipment part. The method may include evaluating the first image with a machine learning model with respect to one or more of a second image or baseline image data to determine whether the equipment part has been prepared for the inspection process. The method may also include preventing the performance of the inspection process on the equipment part based on evaluating the first image with respect to one or more of the second image or the baseline image data indicating that the equipment part has not been prepared for the inspection process.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that improve and verify inspection quality and adherence to established inspection processes and procedures by providing inspection feedback concurrently with the inspection process. The systems and methods provide a way to trace the inspection process through, for example, images, dates, parts, location, and inspector. The systems and method can automatically track and identify non-compliant or at-risk inspections to allow follow up actions to reduce the risk of non-compliant inspections.

Proper inspection of an equipment part requires that inspection criteria be completed before the inspection is conducted. For example, the part may be cleaned in the area to be inspected, the cleaned area may be lined or delineated to indicate the cleaned area from other areas, and the part may be numbered to allow the inspection results to be identified with the inspected part. Failure to complete the inspection criteria may lead to a poor inspection and inaccurate results. A determination that the inspection criteria has been properly completed can reduce occurrences of poor inspection. Providing the inspector with an alert that the equipment part has not been properly prepared for inspection may prevent occurrences of poor inspection.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
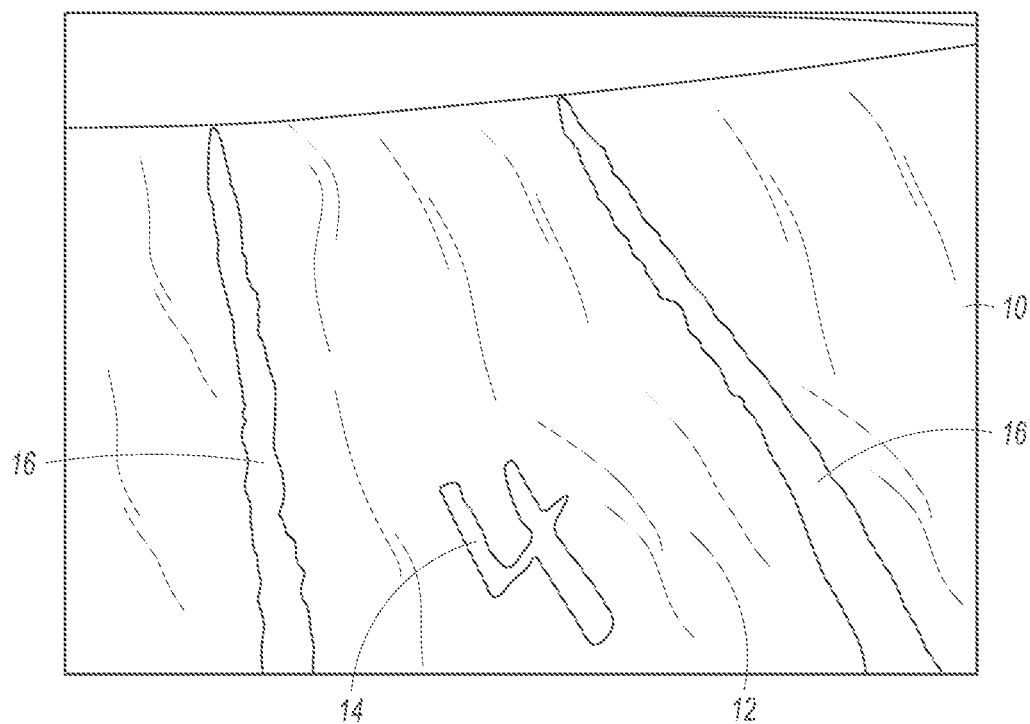
FIG. 1 is an image of an equipment part according to a first state of inspection preparation.

Referring to FIG. 1, an equipment part 10 to be inspected includes an inspection area 12. The equipment part may be, for example, a blade of a fan for a radiator of a locomotive. The inspection area may be a middle portion of the fan blade, i.e., a portion between the ends of the fan blade. The inspection area may be any portion of the equipment part, for example an area where defects such as cracks may occur during use. However, any area of the equipment part may be prepared for inspection and subsequently inspected.

According to other embodiments, equipment parts that may be inspected include heat exchanger tubes, radiator fan blade welds, gearcase assemblies, compressor frames, cables, and wheels. The equipment parts may also be from equipment other than from locomotives, for example aircraft and aircraft engines, construction equipment, power-generating equipment, or another vehicle (e.g., automobile, bus, truck, mining vehicle, marine vessel, agricultural vehicle, etc.). The systems and methods disclosed herein may be applicable to any equipment that is subject to periodic inspection.

Referring again to FIG. 1, the equipment part to be inspected may labeled with a part identifier 14 that is unique to the equipment part. The inspection area of the equipment part may be marked by inspection area markers 16. As shown in the figure, the inspection area is marked by two inspection area markers, but it should be appreciated that any number of inspection area markers, for example one marker or plural markers, may be used to mark the inspection area.

The equipment part of FIG. 1 is an example of poor inspection preparation. The equipment part shows no signs of cleaning. Detection of defects such as cracks with high precision is difficult using current techniques. The lack of cleaning of the equipment part inspection area makes detection of defects more difficult and may result in failure to detect a defect which could result in a failure of the equipment part. An inspection of the equipment part of FIG. 1 may be considered a non-compliant inspection.

Figure 2:
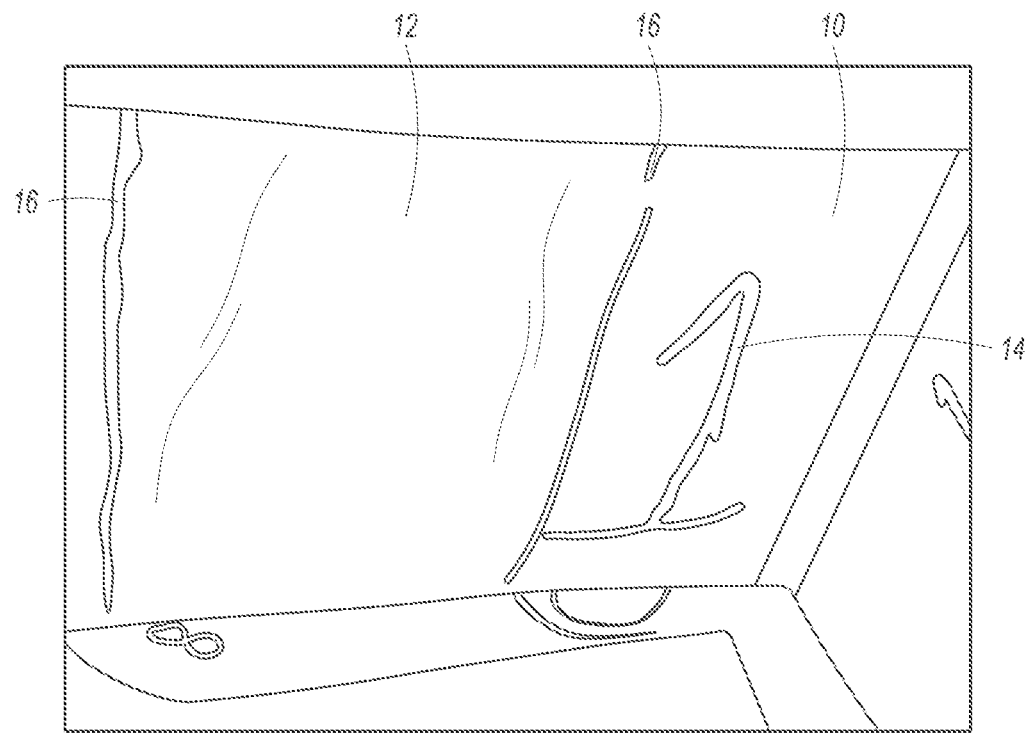
FIG. 2 is an image of an equipment part according to a second state of inspection preparation.

Referring to FIG. 2, an equipment part to be inspected includes a part identifier to identify the part and inspection area markers to identify the inspection area. The equipment part of FIG. 2 is an example of incomplete inspection preparation. The equipment part shows signs of some cleaning, but the inspection area is not cleaned sufficiently to prevent failure of the inspection process to detect a defect, such as a crack. Although the equipment part includes a part identifier and inspection area markers to identify the inspection area, the incomplete cleaning of the inspection area may prevent detection of a defect. An inspection of the equipment part of FIG. 2 may be considered an at-risk or poor inspection.

Figure 3:
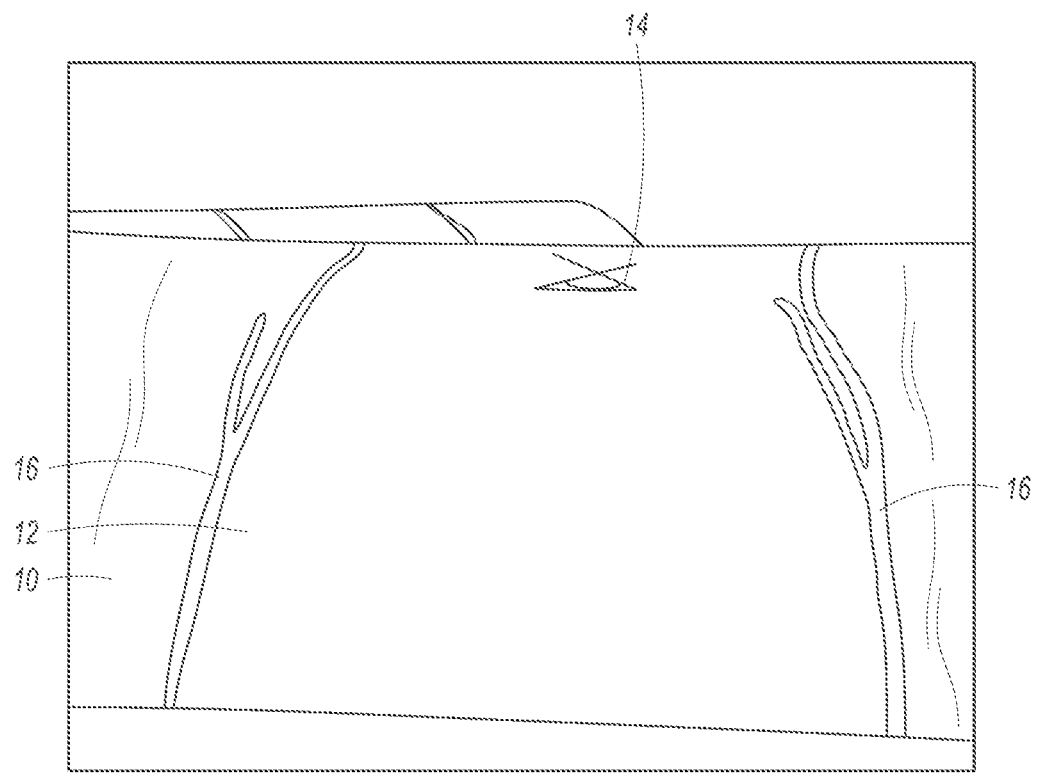
FIG. 3 is an image of an equipment part according to a third state of inspection preparation.

Referring to FIG. 3, an equipment part to be inspected includes a part identifier to identify the part and inspection area markers to identify the inspection area. The inspection area has been cleaned of material or compositions that may make inspection and detection of a defect difficult. For example, the equipment part may be a fan blade for a radiator of a locomotive and may have carbon or soot, grease, and/or rust on the inspection area prior to preparation (cleaning) for inspection. The inspection area of the equipment part of FIG. 3 has been cleaned to remove any such materials or compositions. An inspection of the equipment part of FIG. 3 may be considered a compliant inspection.

Figure 4:
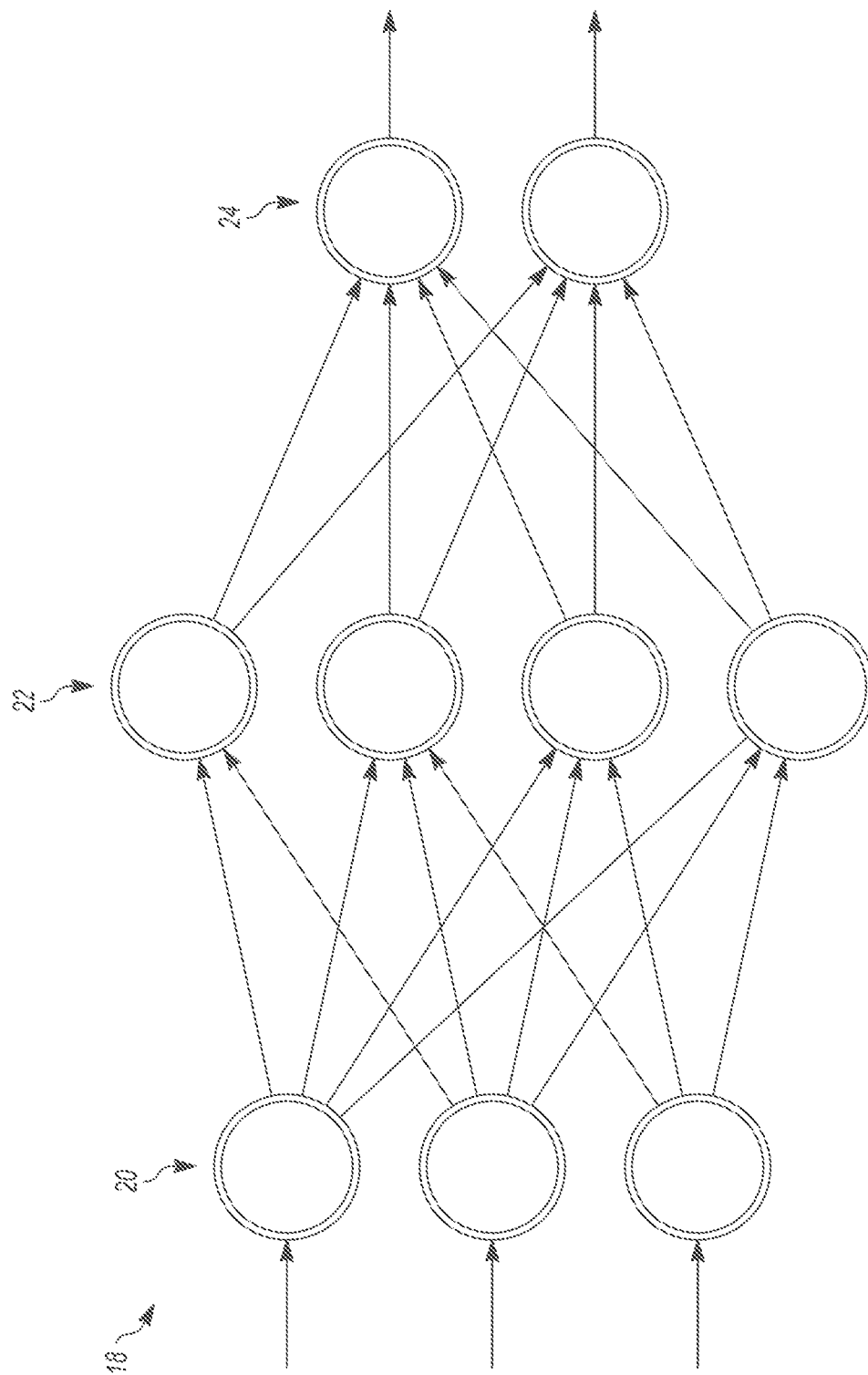
FIG. 4 schematically illustrates a machine learning model according to one embodiment.

Referring to FIG. 4, a machine learning model 18 according to one embodiment may be provided in the form of a neural network. The machine learning model includes an input layer 20, a hidden layer 22, and an output layer 24. The input layer accepts image data representative of an appearance of an equipment part that is to be inspected. The image data is obtained prior to the performance of an inspection process on the equipment part. The equipment part may be prepared for inspection as shown in, for example, FIGS. 1-3. The preparation of any individual equipment part to be inspected may be non-compliant, at-risk, or compliant.

In one embodiment, the machine learning model is a supervised machine learning model. The machine learning model is provided with training data that is labelled. Image data of equipment parts that have been prepared for inspection, i.e., provided with a part identifier, an inspection area marker, and an inspection area that has been at least partially cleaned, is provided to the machine learning model. Each image data of the training data is labelled as either non-compliant, at-risk, or compliant depending on the condition of the equipment part after preparation for inspection. The training data is used by the machine learning model to establish a baseline of a surface profile of the equipment part that may be used to determine if input image data corresponds to a compliant surface profile. If the captured image data of an equipment part to be inspected is determined to correspond to the baseline surface profile of a compliant surface profile, the inspector may be provided with a message that the inspection may proceed. If the captured image data of the equipment part to be inspected does not correspond to the baseline surface profile, for example if the machine learning model determines that the captured image data represents a non-compliant or at-risk inspection preparation, the inspector may be provided with a message that the equipment part has not been prepared for the inspection process, and the inspector may prevent the inspection.

The hidden layer is located between the input layer and the output layer of the algorithm of the machine learning model. The algorithm applies weights to the inputs (e.g., captured image data pixels) and directs them through an activation function as the output. The hidden layer performs nonlinear transformations of the inputs entered into the network.

Figure 5:
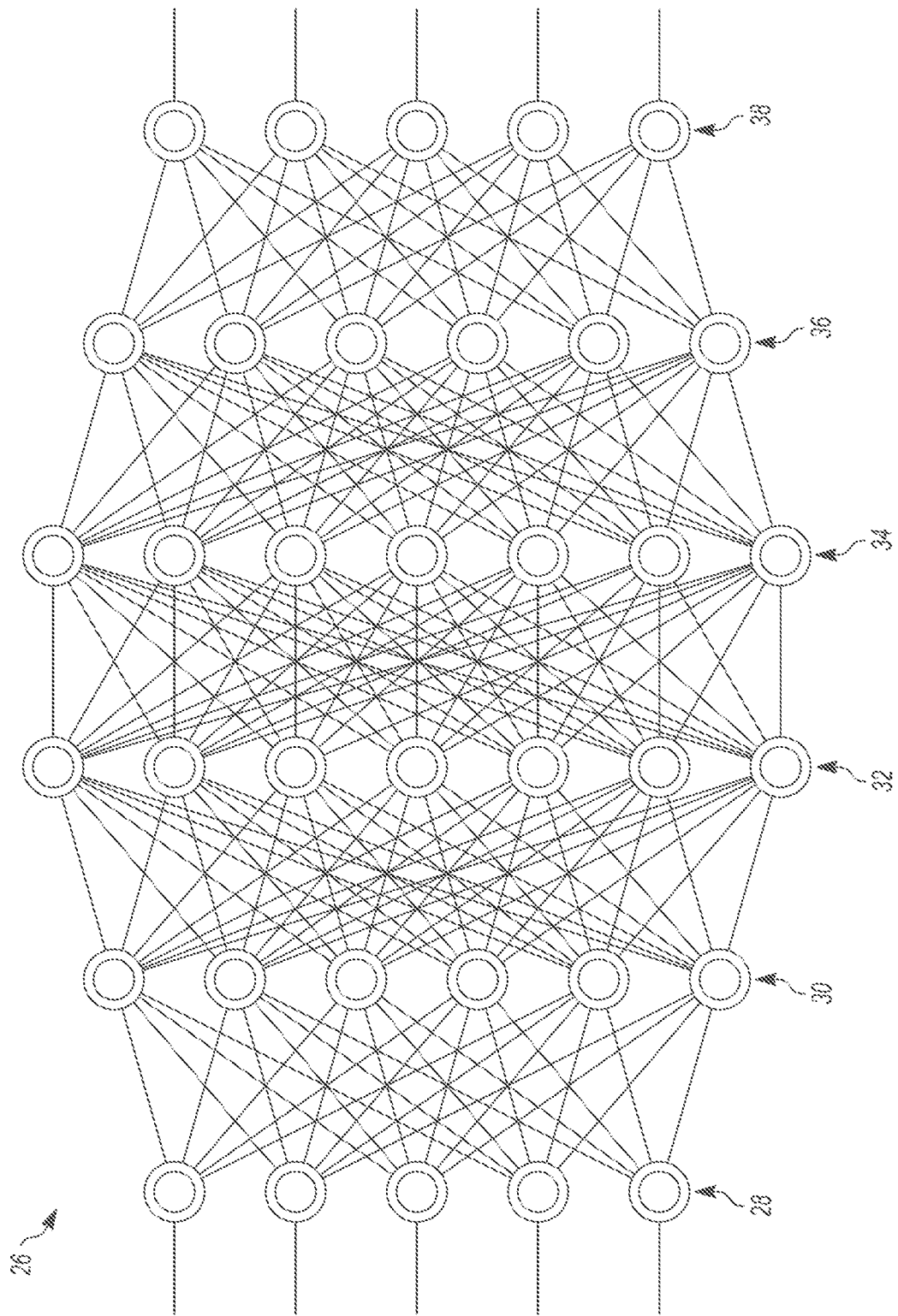
FIG. 5 schematically illustrates a machine learning model according to one embodiment.

Referring to FIG. 5, a machine learning model 26 according to one embodiment includes an input layer 28, a plurality of hidden layers 30, 32, 34, 36, and an output layer 38. The machine learning model may be referred to as a deep learning machine learning model due to the plurality of hidden layers. The hidden layers may vary depending on the function of the machine learning model, and the hidden layers may vary depending on their associated weights. The hidden layers allow for the function of the machine learning model to be broken down into specific transformations of the input data. Each hidden layer function may be provided to produce a defined output. For example, one hidden layer may be used to identify what type of equipment part is to be inspected. The hidden layer may identify the equipment part as a radiator fan blade or a gearcase assembly or some other equipment part to be inspected. Another hidden layer may be provided to identify, for example, the part identifier and another hidden layer may be provided to identify the inspection area marker. Other hidden layers may be provided to detect, for example, whether captured image data represents the same equipment part, blurry images, or lighting of the equipment part. While the functions of each hidden layer are not enough to independently determine if the captured image data represents an equipment part that has been prepared for inspection sufficient to provide a compliant inspection, the hidden layers function jointly within the machine learning model to determine the probability that the captured image data represents a properly prepared equipment part.

Figure 6:
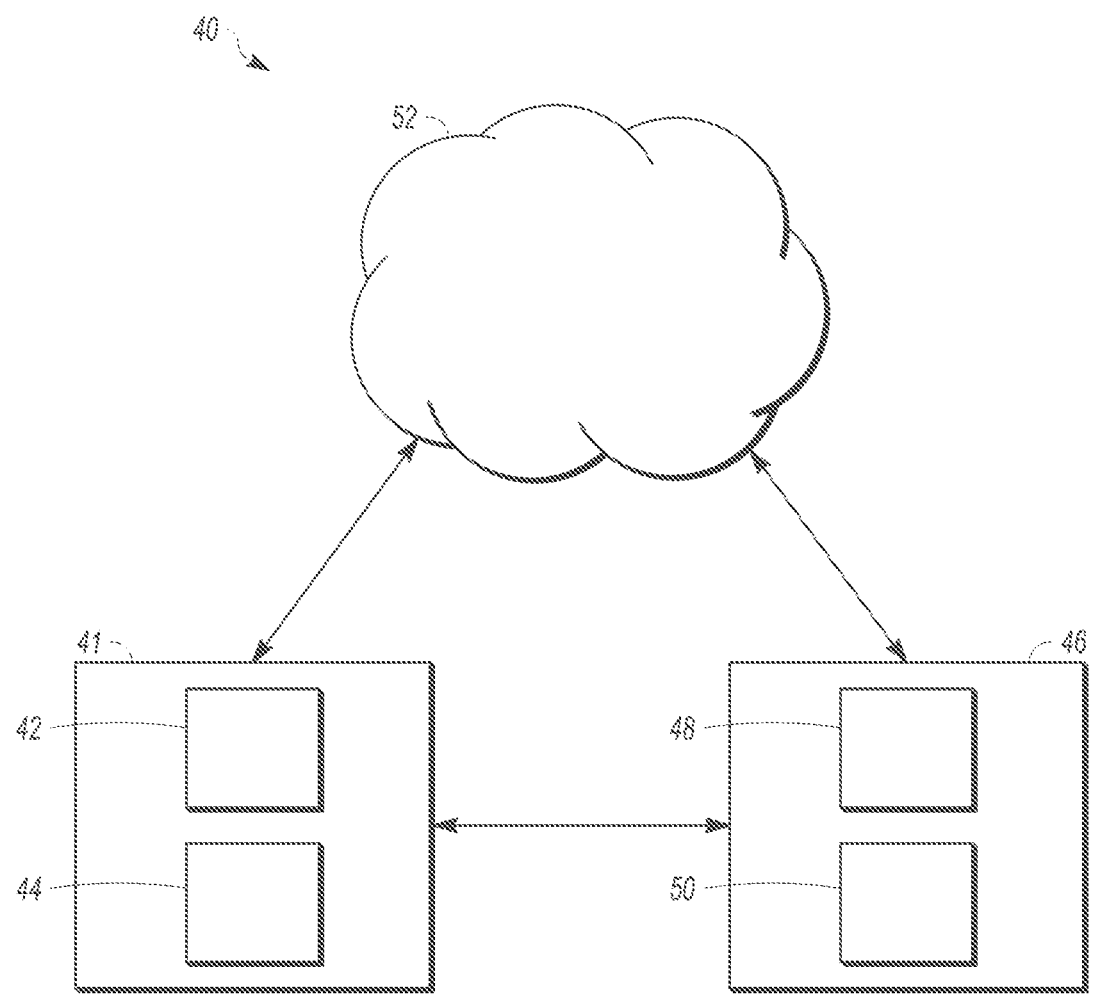
FIG. 6 schematically illustrates a system for evaluating equipment parts to be inspected according to one embodiment.

Referring to FIG. 6, a system 40 for evaluating equipment parts to be inspected includes a mobile, handheld device 41. The mobile, handheld device may be a smartphone or a tablet or a personal digital assistant (PDA). The mobile, handheld device includes an image capture device, e.g., a camera, that is configured to capture images of an equipment part that is to be inspected. The mobile, handheld device also includes a controller 42 that executes instructions stored in a memory 44 to use the machine learning model to determine whether the equipment part that is to be inspected represents a compliant inspection preparation, an at-risk inspection preparation, or a non-compliant inspection preparation.

The system for evaluating equipment parts may also include a computer 46 that includes a controller 48 and a memory 50. The computer may be connected to the mobile, handheld device, for example wirelessly or by a hard connection (e.g., a cable). The memory of the computer may include the training data of the machine learning model. The image data captured by the mobile, handheld device may also be transferred from the mobile, handheld device to the memory of the computer to be added to the training data of the machine learning model. The machine learning model may modify the baseline surface profile image data based on captured image data of the equipment part provided to the memory of the mobile, handheld device and/or the memory of the computer.

The processor of the computer may also execute instructions in the memory of the computer to use the machine learning model to determine whether the equipment part that is to be inspected represents a compliant inspection preparation, an at-risk inspection preparation, or a non-compliant inspection preparation. In one embodiment, the mobile, handheld device may be a digital camera that captures images of the equipment part to be inspected. The image data may be transferred to the memory of the computer and the controller of the computer may use the machine learning model to determine if the equipment part corresponds to the baseline surface image data that represents a compliant inspection preparation. Other image capture devices may be used to capture image data of the equipment part to be inspected. For example, a camera may be worn by an inspector preparing the equipment part for inspection. As another example, a camera may be provided on a scope for insertion into an interior of an equipment part or provided on an unmanned aerial vehicle (e.g., a drone) to capture image data on a remote equipment part.

The system may also include a cloud computing network 52. The cloud computing network may store image capture data, including for example the training data for the machine learning model and image capture data obtained during inspections of equipment parts. The cloud computing network may include one or more cloud computing nodes with which the mobile, handheld device and/or the computer may communicate. The nodes may communicate with one another and may be grouped physically or virtually, in one or more networks. The cloud computing network can communicate with any type of computerized device, including for example the mobile, handheld device and the computer, over any type of network and/or network addressable connection (e.g., using a web browser).

The cloud computing network may also use the machine learning model to evaluate captured image data provided from the mobile, handheld device and/or the computer to determine whether the equipment part to be inspected represents a compliant preparation for inspection, an at-risk preparation, or a non-compliant preparation.

The captured image data of the equipment part to be inspected may include one or more images or video frames of visible light reflected off the equipment part. The captured image data of the equipment part to be inspected may additionally or alternatively include one or more images or video frames of light outside of the visible spectrum reflected off the equipment part. The machine learning model may identify blurry images based on the reflected light. The machine learning model may also determine if multiple captured image data is reflected from the same, or different, equipment parts.

Figure 7:
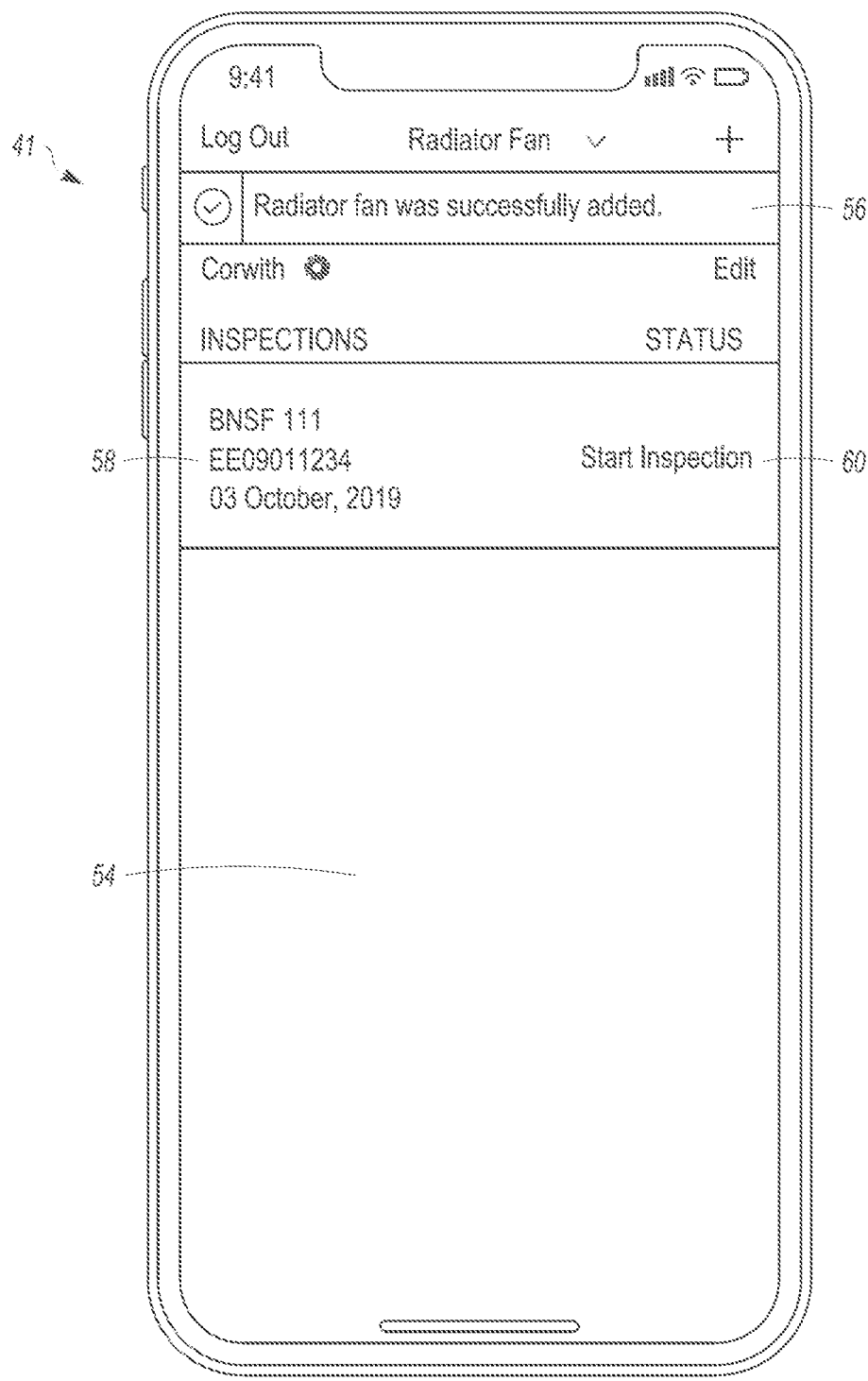
FIG. 7 schematically illustrates an application for evaluating image data of an equipment part according to one embodiment.

Referring to FIG. 7, the mobile, handheld device may execute a program or application for evaluating an equipment part to be inspected by operation of an application provided on the mobile, handheld device. According to other embodiments, the program or application may be executed on the computer. The program or application accepts input through, for example, a touch screen 54 and allows an inspector to indicate the particular equipment part to be inspected, e.g., a radiator fan, and provides a display 56 that the equipment part has been added to the inspection history of equipment parts. The program or application allows the inspector to input identification information 58 that may include, for example, the name and/or location of the inspection facility, a serial or tracking number of the equipment part to be inspected, and a date of the inspection. Upon confirmation of the identification information the program or application provides an input 60 to start the inspection.

Figure 8:
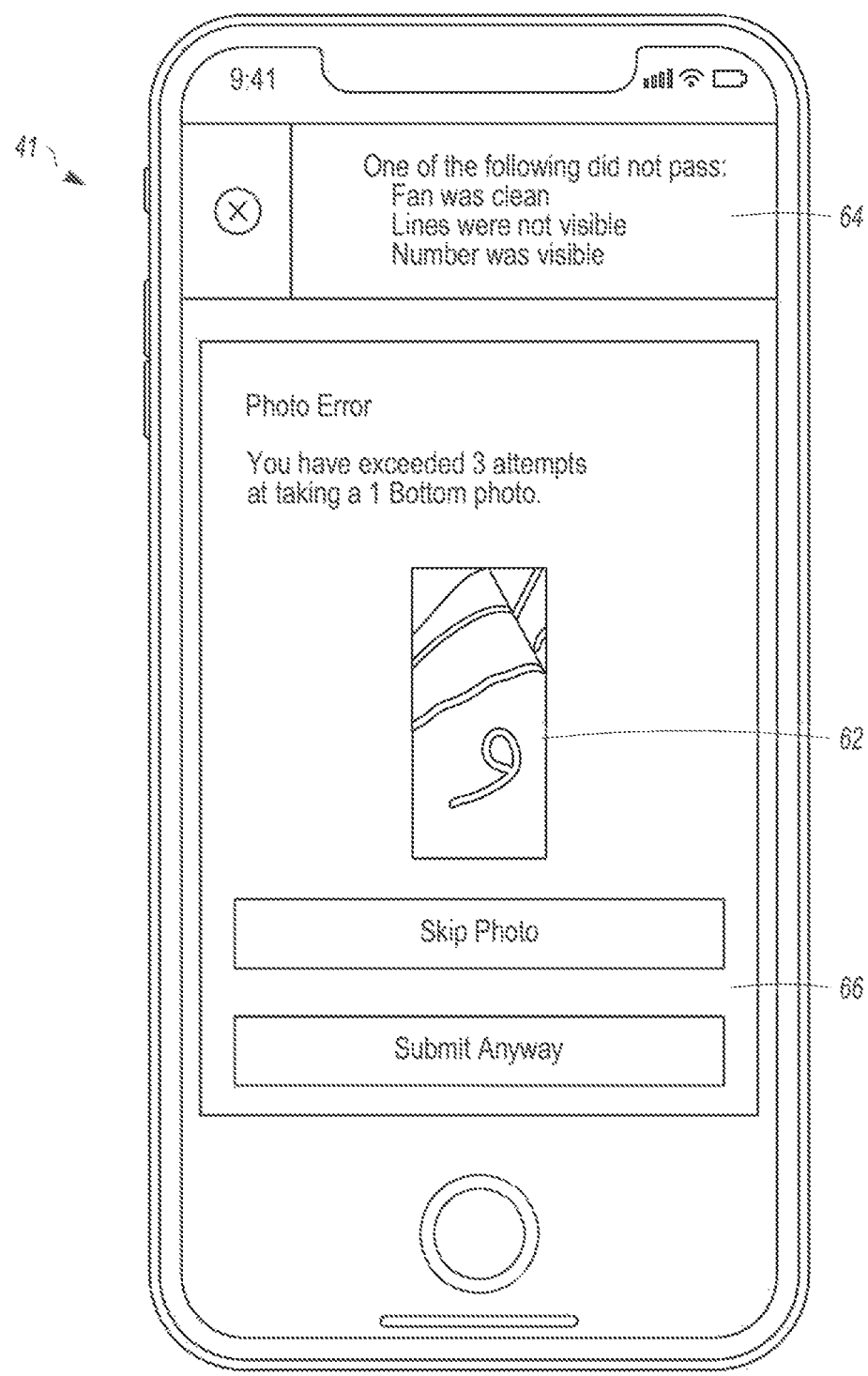
FIG. 8 schematically illustrates an application for evaluating image data of an equipment part according to one embodiment.

Referring to FIG. 8, an image 62 of an equipment part to be inspected is evaluated by the machine learning model. The machine learning model may conclude that the image data does not correspond to the baseline image data of the machine learning model and that the preparation of the equipment part represents an at-risk or non-compliant preparation. For example, the machine learning model may alert the inspector that the inspection area marker (e.g., lines) that define the inspection area are not visible. The machine learning model may also determine that other characteristics of the image data make evaluation of the image data of the equipment part unreliable. For example, the machine learning model may determine that the image data is blurry, or that the image data is not of the same equipment part as previous captured image data. The machine learning model may provide evaluation information 64 of the image data to the inspector that identifies problems with the preparation or the image data that may result in an at-risk or non-compliant inspection. The application also includes an input 66 that allows the inspector to either exclude the image data from the final evaluation by the machine learning model or to include the image data in the final evaluation by the machine learning model.

Figure 9:
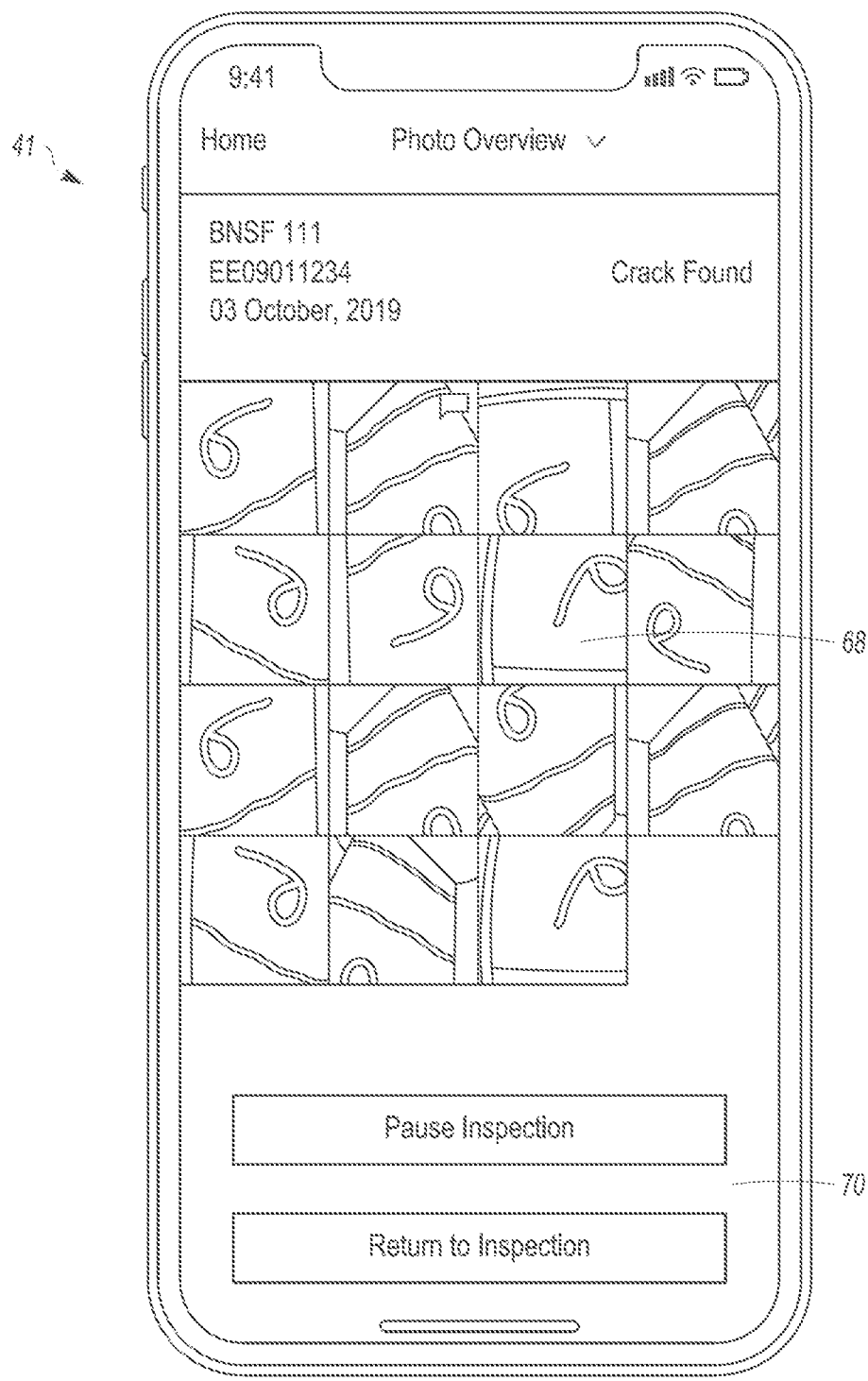
FIG. 9 schematically illustrates an application for evaluating image data of an equipment part according to one embodiment.

Referring to FIG. 9, the program or application presents multiple image data 68 of the equipment part to be inspected on the display. The machine learning model determines whether each image is from the same equipment part. The machine learning model also determines whether a number of the image data represent compliant preparation of the equipment part to be inspected and that the number of compliant image data is a specified percentage of all of the image data of the equipment part. If there are an insufficient number of image data that indicate a compliant inspection may be performed and/or the number of image data that indicates a compliant inspection may be performed is not a sufficient percentage of all of the image data, the program or application may automatically send an alert, e.g. by email, to an account or an inspection facility that an inspection of the equipment part should not be performed because the equipment part has not been prepared properly and represents an at-risk or non-compliant inspection. The alert may prevent inspection of the equipment part. If the machine learning model determines that the image data corresponds to the baseline image data that would provide a compliant inspection, the program or application includes an input 70 that allows the inspector to continue or pause the inspection.

Figure 10:
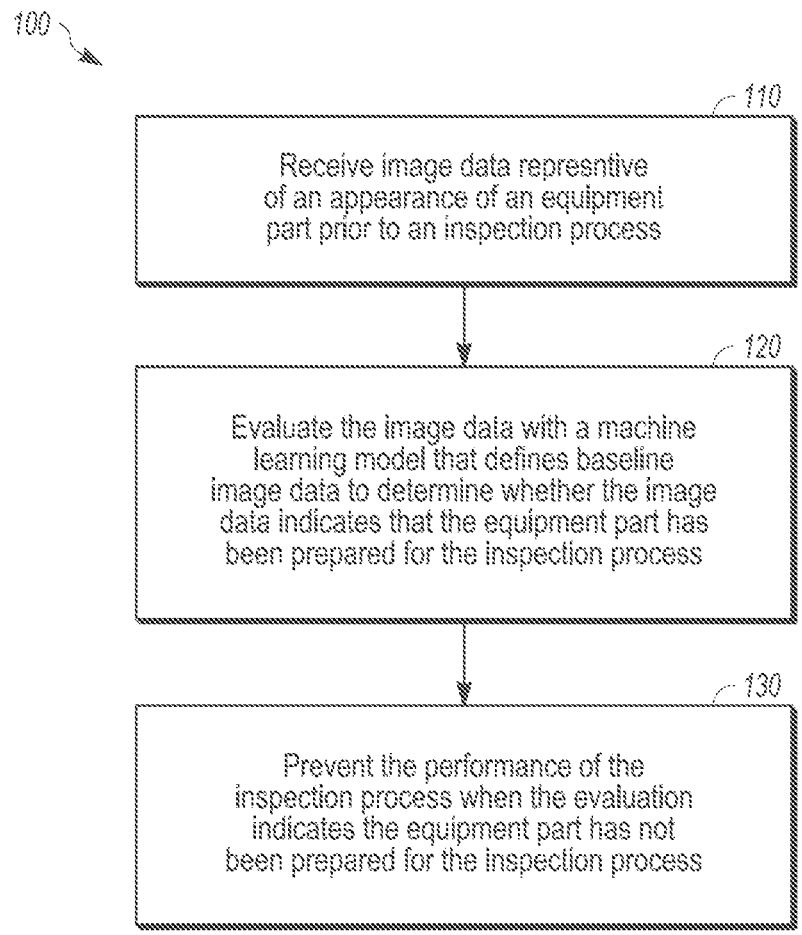
FIG. 10 schematically illustrates a method according to one embodiment.

Referring to FIG. 10, a method 100 comprises a step 110 of receiving image data representative of an appearance of an equipment part, the image data obtained prior to performance of an inspection process on the equipment part and a step 120 of evaluating the image data with a machine learning model that defines baseline image data to determine whether the image data indicates that the equipment part has been prepared for the inspection process. The method further comprises a step 130 of preventing the performance of the inspection process on the equipment part when the evaluation of the image data with respect to the baseline image data indicates that the equipment part has not been prepared for the inspection process.

Figure 11:
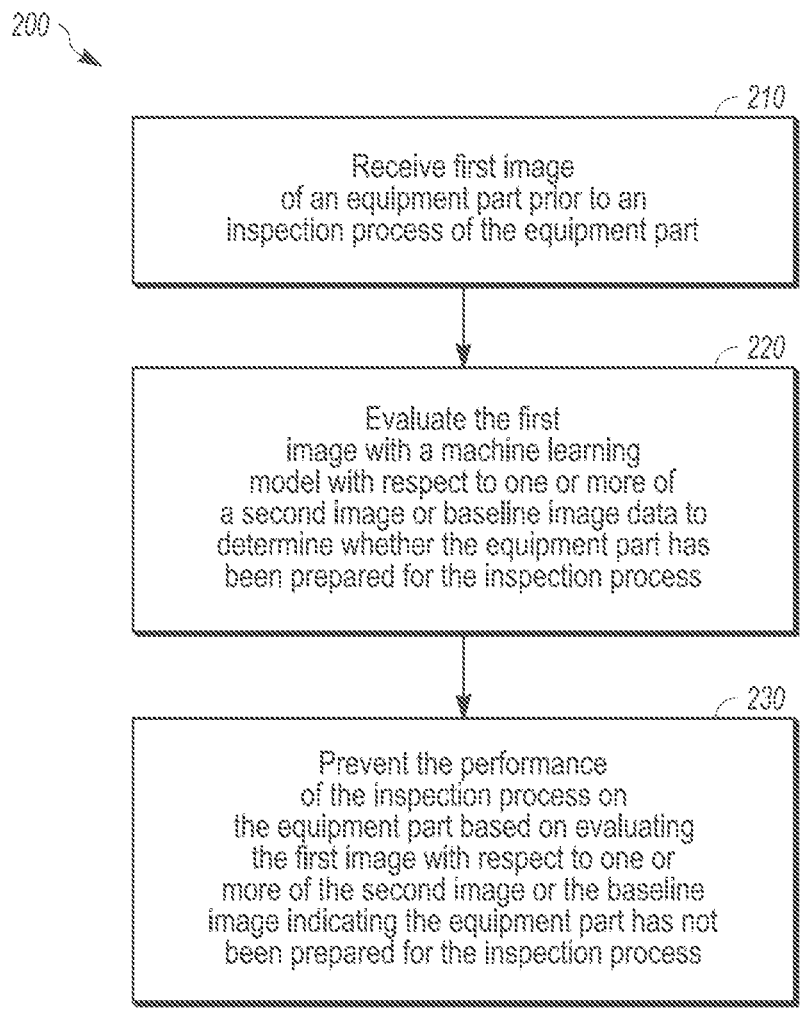
FIG. 11 schematically illustrates a method according to one embodiment.

Referring to FIG. 11, a method 200 comprises a step 210 of receiving image data representative of an appearance of an equipment part. The image data may be obtained prior to performance of an inspection process on the equipment part. The method also comprises a step 220 of evaluating the image data with a machine learning model that defines baseline image data to determine whether the image data indicates that the equipment part has been prepared for the inspection process. The method further comprises a step 230 of preventing the performance of the inspection process on the equipment part when the evaluation of the image data with respect to the baseline image data indicates that the equipment part has not been prepared for the inspection process.

A method may include receiving image data representative of an appearance of an equipment part, the image data obtained prior to performance of an inspection process on the equipment part and evaluating the image data with a machine learning model that defines baseline image data to determine whether the image data indicates that the equipment part has been prepared for the inspection process. The method may further include preventing the performance of the inspection process on the equipment part when the evaluation of the image data with respect to the baseline image data indicates that the equipment part has not been prepared for the inspection process.

The image data may be evaluated with respect to the baseline image data to determine whether the equipment part has been one or more of cleaned, marked with inspection marks, or marked with identifying marks. The baseline image data may include or be based on one or more historical images of the equipment part.

The method may further include modifying the baseline image data based on usage of the equipment part. The method may further include evaluating different portions of the image data with each other to determine whether the different portions of the image data are images of a same area of the equipment part and preventing the performance of the inspection process on the equipment part responsive to the different portions of the image data being the images of the same area of the equipment part.

The method may further include receiving an inspection result of the inspection process performed on the equipment part and modifying the inspection result based on the image data that is received. The inspection result may be modified from a first conclusion of no damage or an acceptable amount of damage to a different, second conclusion of damage or an unacceptable amount of damage responsive to the image data indicating that the equipment part has not been prepared for the inspection process.

The image data may include one or more images or video frames of visible light reflected off the equipment part. The image data may include one or more images or video frames of light outside of a visible spectrum of the light.

A system may include a controller that receives image data representative of an appearance of an equipment part. The image data may be obtained prior to performance of an inspection process on the equipment part. The controller may use a machine learning model to evaluate the image data with respect to baseline image data to determine whether the equipment part has been prepared for the inspection process. The controller may prevent the performance of the inspection process on the equipment part based on the evaluation of the image data with respect to the baseline image data indicating that the equipment part has not been prepared for the inspection process.

The controller may evaluate the image data with respect to the baseline image data to determine whether the equipment part has been one or more of cleaned, marked with inspection marks, or marked with identifying marks. The baseline image data may include or is based on one or more historical images of the equipment part.

The controller may further modify the baseline image data based on usage of the equipment part. The controller may further evaluate different portions of the image data with each other to determine whether the different portions of the image data are images of a same area of the equipment part and prevent the performance of the inspection process on the equipment part responsive to the different portions of the image data being the images of the same area of the equipment part.

The controller may further receive an inspection result of the inspection process performed on the equipment part and modify the inspection result based on the image data that is received, wherein the inspection result is modified from a first conclusion of no damage or an acceptable amount of damage to a different, second conclusion of damage or an unacceptable amount of damage responsive to the image data indicating that the equipment part has not been prepared for the inspection process.

The image data may include one or more images or video frames of visible light reflected off the equipment part. The image data may include one or more images or video frames of light outside of a visible spectrum of the light.

A method may include receiving a first image of an equipment part prior to an inspection process of the equipment part and evaluating the first image with a machine learning model with respect to one or more of a second image or baseline image data to determine whether the equipment part has been prepared for the inspection process. The method may further include preventing the performance of the inspection process on the equipment part based on evaluating the first image with respect to one or more of the second image or the baseline image data indicating that the equipment part has not been prepared for the inspection process.

The first image may be evaluated with respect to the baseline image data to determine whether the equipment part has been one or more of cleaned, marked with inspection marks, or marked with identifying marks. The first image may be evaluated with respect to the second image to determine whether the first image and the second image show the same equipment part, and the performance of the inspection process may be prevented responsive to determining that the first image and the second image show the same equipment part.

The method may further include receiving an inspection result of the inspection process performed on the equipment part and modifying the inspection result based on the image data that is received. The inspection result may be modified from a first conclusion of no damage or an acceptable amount of damage to a different, second conclusion of damage or an unacceptable amount of damage responsive to the image data indicating that the equipment part has not been prepared for the inspection process.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   receiving image data representative of an appearance of an equipment part, the image data obtained prior to performance of an inspection process on the equipment part;
   evaluating the image data with a neural network formed from multiple layers that transform the image data using a machine learning model that defines baseline image data to determine whether the image data indicates that the equipment part has been prepared for the inspection process; and
   preventing the performance of the inspection process on the equipment part responsive to the evaluation of the image data by the neural network with respect to the baseline image data indicating that the equipment part has not been prepared for the inspection process, wherein the image data is evaluated with respect to the baseline image data to determine whether the equipment part has been one or more of cleaned, marked with inspection marks, or marked with identifying marks.

2. The method of claim 1, wherein the baseline image data includes or is based on one or more historical images of the equipment part.

3. The method of claim 1, further comprising:
   modifying the baseline image data based on usage of the equipment part.

4. The method of claim 1, further comprising:
   evaluating different portions of the image data with each other to determine whether the different portions of the image data are images of a same area of the equipment part; and
   preventing the performance of the inspection process on the equipment part responsive to the different portions of the image data being the images of the same area of the equipment part.

5. The method of claim 1, further comprising:
   receiving an inspection result of the inspection process performed on the equipment part; and
   modifying the inspection result based on the image data that is received, wherein the inspection result is modified from a first conclusion of no damage or an acceptable amount of damage to a different, second conclusion of damage or an unacceptable amount of damage responsive to the image data indicating that the equipment part has not been prepared for the inspection process.

6. The method of claim 1, wherein the image data includes one or more images or video frames of visible light reflected off the equipment part.

7. The method of claim 1, wherein the image data includes one or more images or video frames of light outside of a visible spectrum of the light.

8. A system comprising:
    a controller configured to receive image data representative of an appearance of an equipment part, the image data obtained prior to performance of an inspection process on the equipment part, the controller comprising a neural network formed from multiple layers configured to:
        transform the image data using a machine learning model to evaluate the image data with respect to baseline image data to determine whether the equipment part has been prepared for the inspection process; and
        prevent the performance of the inspection process on the equipment part based on the evaluation of the image data with respect to the baseline image data indicating that the equipment part has not been prepared for the inspection process, wherein the controller is configured to evaluate with respect to the baseline image data to determine whether the equipment part has been one or more of cleaned, marked with inspection marks, or marked with identifying marks.

9. The system of claim 8, wherein the baseline image data includes or is based on one or more historical images of the equipment part.

10. The system of claim 8, wherein the controller is further configured to:
    modify the baseline image data based on usage of the equipment part.

11. The system of claim 8, wherein the controller is further configured to:
    evaluate different portions of the image data with each other to determine whether the different portions of the image data are images of a same area of the equipment part; and
    prevent the performance of the inspection process on the equipment part responsive to the different portions of the image data being the images of the same area of the equipment part.

12. The system of claim 8, wherein the controller is further configured to:
    receive an inspection result of the inspection process performed on the equipment part; and
    modify the inspection result based on the image data that is received, wherein the inspection result is modified from a first conclusion of no damage or an acceptable amount of damage to a different, second conclusion of damage or an unacceptable amount of damage responsive to the image data indicating that the equipment part has not been prepared for the inspection process.

13. The system of claim 8, wherein the image data includes one or more images or video frames of visible light reflected off the equipment part.

14. The system of claim 8, wherein the image data includes one or more images or video frames of light outside of a visible spectrum of the light.

15. A method comprising:
    receiving a first image of an equipment part prior to an inspection process of the equipment part;
    evaluating the first image with a neural network formed from multiple layers that transform the first image using a machine learning model with respect to one or more of a second image or baseline image data to determine whether the equipment part has been prepared for the inspection process; and
    preventing performance of the inspection process on the equipment part based on evaluating the first image with respect to one or more of the second image or the baseline image data indicating that the equipment part has not been prepared for the inspection process, wherein the first image is evaluated with respect to the baseline image data to determine whether the equipment part has been one or more of cleaned, marked with inspection marks, or marked with identifying marks.

16. The method of claim 15, wherein the first image is evaluated with respect to the second image to determine whether the first image and the second image show the same equipment part, and the performance of the inspection process is prevented responsive to determining that the first image and the second image show the same equipment part.

17. The method of claim 15, further comprising:
    receiving an inspection result of the inspection process performed on the equipment part; and
    modifying the inspection result based on the image data that is received, wherein the inspection result is modified from a first conclusion of no damage or an acceptable amount of damage to a different, second conclusion of damage or an unacceptable amount of damage responsive to the image data indicating that the equipment part has not been prepared for the inspection process.

* * * * *